Aug. 13, 1940.   M. EWALD   2,210,910
PEEL SCAVENGING MECHANISM FOR FRUIT TREATING APPARATUS
Original Filed April 5, 1934   3 Sheets-Sheet 1

INVENTOR:
Mark Ewald
BY
ATTORNEY.

Aug. 13, 1940. M. EWALD 2,210,910
PEEL SCAVENGING MECHANISM FOR FRUIT TREATING APPARATUS
Original Filed April 5, 1934  3 Sheets-Sheet 3
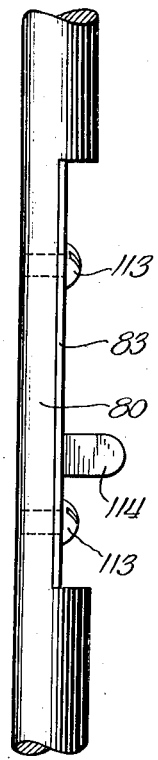
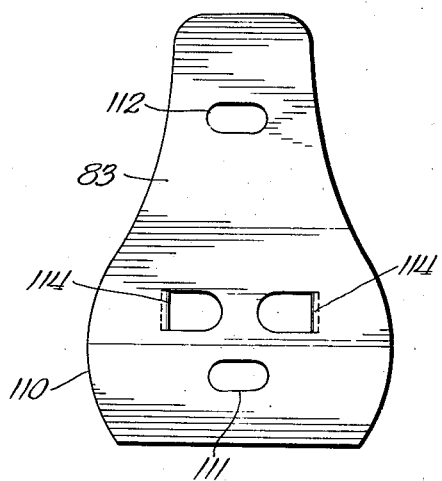
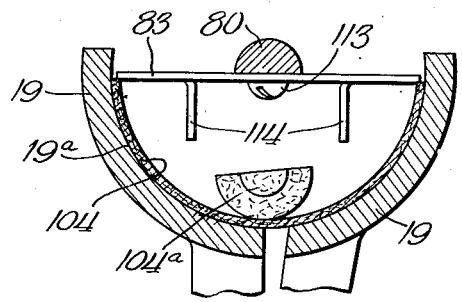
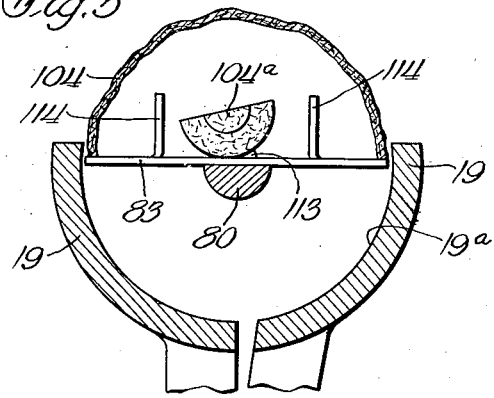
INVENTOR.
Mark Ewald
BY
ATTORNEY.

Patented Aug. 13, 1940

2,210,910

UNITED STATES PATENT OFFICE 2,210,910

PEEL SCAVENGING MECHANISM FOR FRUIT TREATING APPARATUS

Mark Ewald, Olympia, Wash., assignor to Special Equipment Company, Portland, Oreg., a corporation of Oregon Continuation of application Serial No. 719,093, April 5, 1934. This application January 21, 1935, Serial No. 2,620. Renewed October 2, 1939

30 Claims. (Cl. 146—43)

The present invention has to do with a machine for peeling and coring pears and more particularly to an improved mechanism for scavenging from cups the cores and peels that have been removed from such fruit.

This application is a continuation of my prior application Serial No. 719,093, filed April 5, 1934, entitled Scavenging blade, which application in turn is based on a structure shown but not claimed in my copending application Serial No. 614,063, filed May 28, 1932, entitled Fruit cutting apparatus, and which structure is fully and completely disclosed but not claimed in my co-pending application Serial No. 636,447, filed October 6, 1932, entitled Pear treating apparatus, reference to which is herein made for a fuller disclosure of the invention.

The present invention relates to a fruit handling apparatus having holding means from which the body of a peeled fruit is removed leaving behind in the holding means the peel and sometimes other refuse, such as the core, therein. The invention has to do particularly with a means for scavenging such a holding means of any fruit waste content that may be therein.

The primary object of the present invention is the provision of improved scavenging device of compact construction, few parts, rugged, economical, and of simple, efficient, and speedy operation.

A second object of the present invention is the provision of a novel form of scavenging blade preventing accidental displacement therefrom of fruit peel and fruit core.

Another object of the present invention is the provision of an improved scavenging blade of an unique form which may be readily manufactured.

With the above objects and other desirable objects in view, one embodiment of the invention is hereinafter illustrated and described in conjunction with three sheets of drawings, hereby made a part of this specification, and in which:

Figure 3 is a side elevation of the scavenging blade shown in Figure 2 illustrating one manner of attaching a stem thereto;

Figure 4 is an end view of the scavenging blade or plate shown in Figures 1, 2 and 3 and illustrating the position of such blade with respect to a fruit receptacle at the time of initial scavenging movement;

Figure 5 is a view similar to that of Figure 4, illustrating the same parts after movement of the scavenging blade through the fruit receptacle; and Figure 6 is a plan view of an improved blade constructed in accordance with the present invention.

Like reference characters are used to indicate similar parts throughout the following description and in the accompanying three sheets of drawings hereby made a part of this specification.

Figure 1:
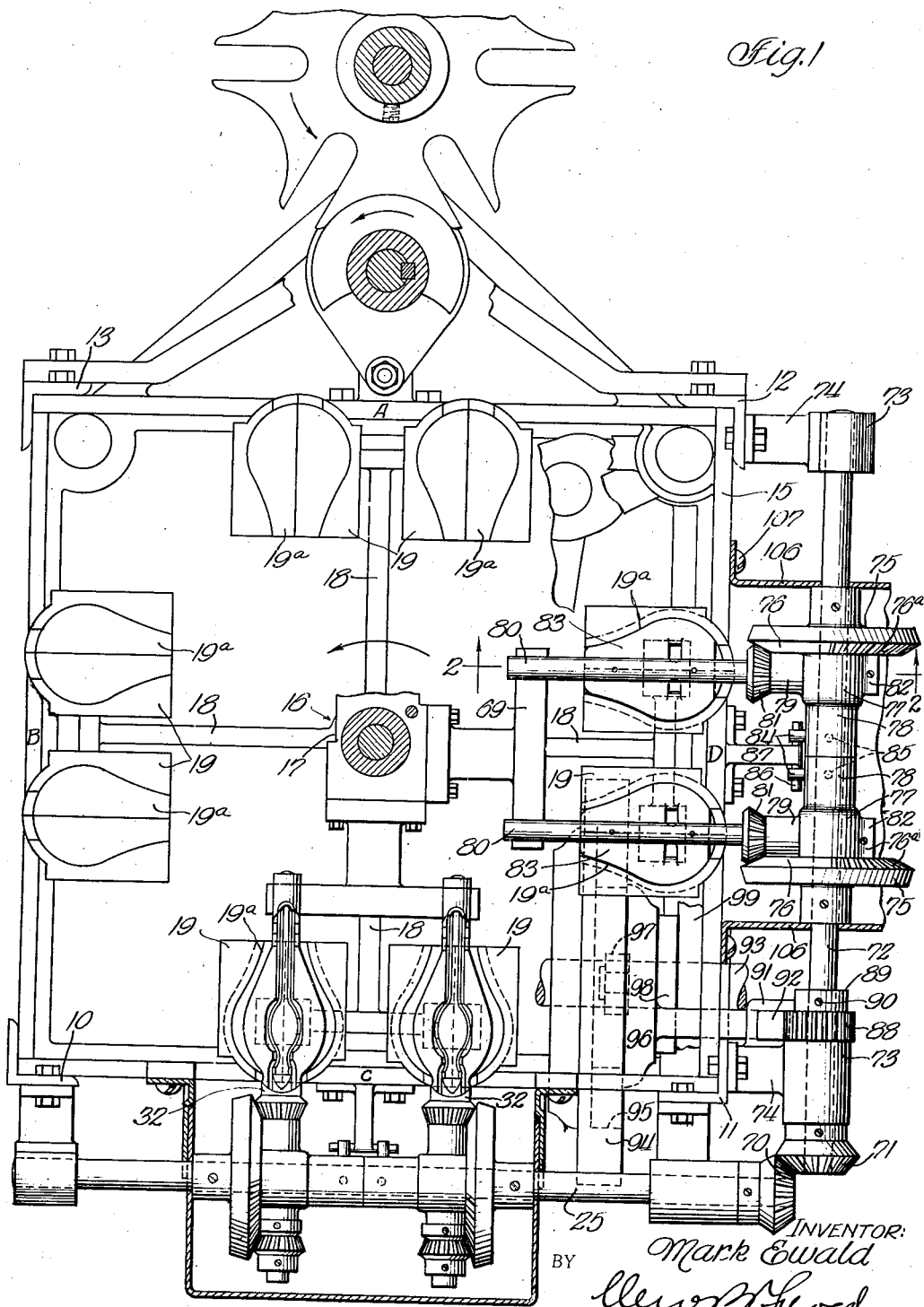
Figure 1 is a fragmentary plan view of a pear peeling machine having as a part thereof a scavenging blade constructed in accordance with the present invention.

In Figure 1, four upright angle posts 10, 11, 12 and 13 are shown. These angle posts constitute generally a frame for a fruit peeling machine. A cross member 15 on the frame acts as a support for the presently described scavenging apparatus. The peeling machine illustrated has a turret 16 comprising a central bearing block 17 from which horizontal arms 18 radiate quadrantly, the arms 18 supporting at their outer ends means for holding half fruit portions such as half pears. The holding means herein illustrated comprises preferably fruit cups 19. The turret 16 rotates in intermittent ninety degree advances in an anti-clockwise direction when viewed from above.

Progressively the turret acts intermittently to advance each pair of receptacles 19 to several stations, identified by the letters A, B, C and D. The advance of fruit through the machine is in the order given. Before reaching the station A, the fruit has been divided longitudinally into halves. At station A, one half of each fruit is introduced into each receptacle 19 with the flat plane or cut face of the fruit upwardly exposed. A subsequent shift of the turret advances the cups holding the half fruit to station B where a paring operation is performed, the body of the fruit or edible pulp being separated from the epidermis without changing the relative position of such body and epidermis.

The paring operation having been completed, the cups 19 and contents comprising the body of the fruit and the separated peels which generally is in one piece, advance to station C where the core is separated from the body of the fruit and the pared and cored fruit body is concurrently removed from the receptacle 19. The core may drop away from the fruit and into the receptacle 19 from which the fruit was discharged. Such core may fall clear of the cup 19. The core removing mechanism herein illustrated as disposed at station C is fully described and claimed in the co-pending application of Mark Ewald, serially numbered 614,062, filed May 28, 1932.

Figure 2:
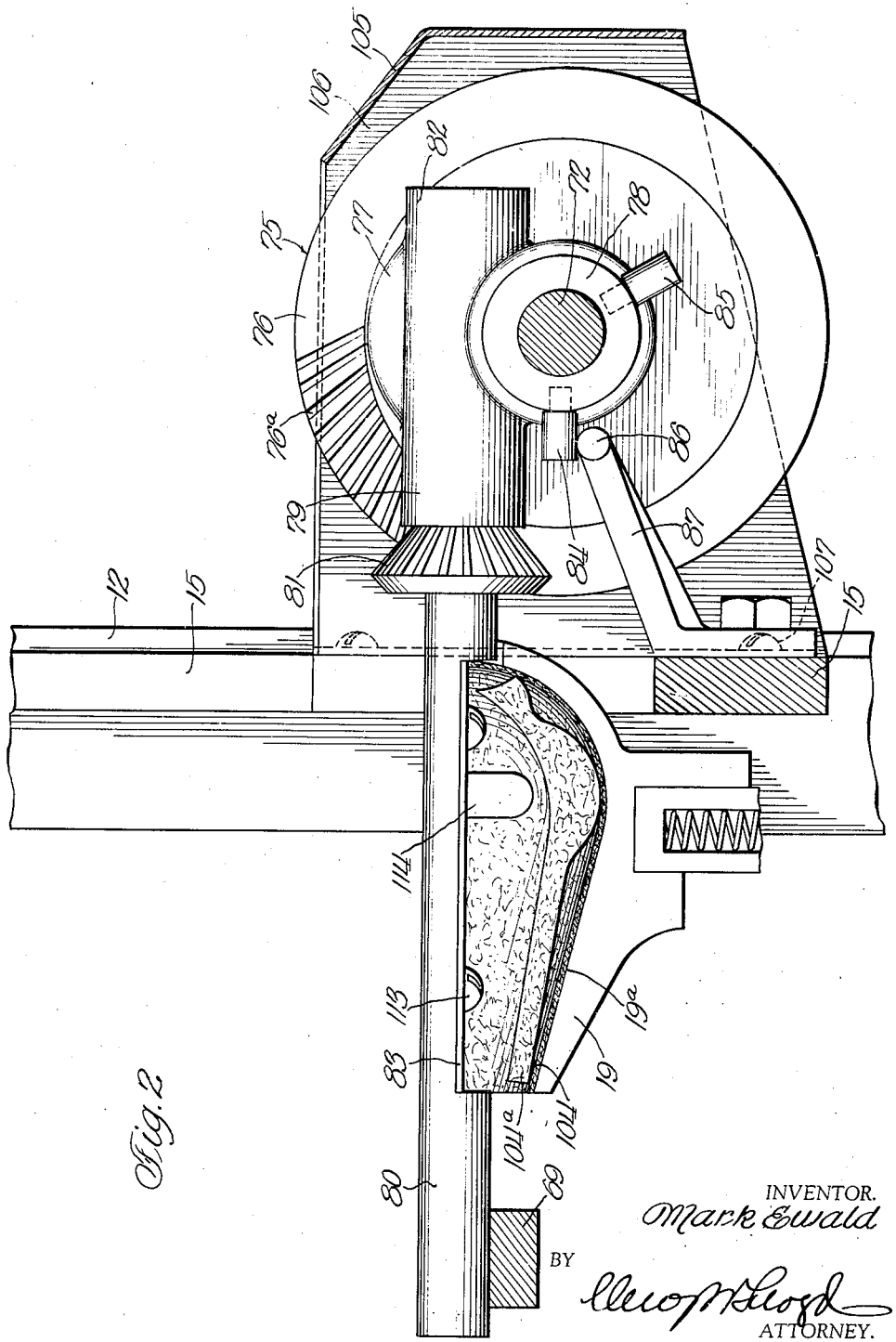
Figure 2 is a cross section of the scavenging blade and the surrounding mechanism, taken on the line 2—2 of Figure 1.

Figure 2 illustrates the scavenging blade in section and the operating mechanism which is disposed at a station D used therewith in detail. The pear body having been removed from the cup 19, leaving the peel and sometimes the core in said receptacle, it is necessary to free the receptacle of such refuse. The cup 19 with its contents is advanced to station D where the final operation of the main machine, namely, scavenging the cups, is accomplished in the regular course of the ninety degree advances of the turret.

The coring device at station C is operated by a shaft 25 to which a pinion 70 is fixed. The pinion 70 is engaged by a like pinion 71, the rotating axis of the latter being ninety degrees to to former. The pinion 71 is mounted on a shaft 72. Shaft 72 is journalled in bearings 73 upon arms 74 which are bolted to frame legs 11 and 12.

A pair of gears 75 are keyed to shaft 72 to rotate therewith. These gears have beveled faces 76 disposed in opposed relation, and a large portion of the beveled periphery of these gears is untoothed. However, a segment of beveled gear teeth 76a is provided on each of the beveled faces of these gears. Surrounding shaft 72 and intermediate the gears 75 are a pair of friction bearings 77 constructed and arranged much like the friction bearings disclosed in my prior application Serial No. 614,062 or application Serial No. 636,447, reference to which has hereinbefore been made. These friction boxes are rotatably disposed upon the shaft 72 by bearings 78, which bearings 78 are coextensive with the space between the bevel gears 75. Immediately above the bearings 78 and extending from the friction boxes 77 are elongated bearings 79, each carrying a spindle 80 on which is keyed a pinion 81. The pinion 81 engages the gear teeth 76a during appropriate rotation of the bevel gears 75 and likewise coacts with a collar 82 to retain the journalled position of the shaft 80.

A flat leaf like scavenging member 83 is secured to spindles 80 in a position over recesses 19a in cups 19. It is preferably in the form of spade or blade 83. The edge periphery of members 83 is such as to comb the inner walls of cavity 19a when rotated about the axis of shaft 80.

Pins 84 and 85 are placed at a ninety degree interval on bearings 78 to collide with a stop 86 on post 87 secured to frame member 15. Limited rotative movement of sleeves 78 about shaft 72 is thereby attained. The inner and extended ends of carrier shafts 80 strike abutments 69 simultaneously with the contact of lugs 84 with stops 86 to thus carry the weight of the spindles and eliminate the shock otherwise absorbed by said lugs.

A gear 88 is keyed to shaft 72 contiguous to the bearing 73 near the forward side of the machine. An off-set sleeve 89 coacts with a set screw 90 to prevent axial displacement of pinion 88. Below the assembly just described and attached to leg 11 of the frame is a guide standard 91 functioning to keep the teeth of a rack 92 in mesh with the teeth of the pinion 88.

Feathered to the main drive shaft 93 of the machine is a cam 94, with an eccentric cam groove 95 in the side thereof. The bottom end of rack 92 is welded or otherwise suitably attached to a cam follower plate 96. A lug 97 in the upper end of the plate rides in cam groove 95. The back of the plate 96 is in abutment with a washer 98 which is disposed upon shaft 93 adjacent block 99. Thus, lug 97 is confined in the eccentric groove 95.

The rack 92 is drawn downwardly by the cam follower 96 through power received from the main drive shaft 93. Further downward motion of the rack rotates the shaft 72 and shaft 25 of the core removing mechanism synchronously because of the coaction of the pinions 70 and 71. By downward movement of the rack 92, the shaft 72 is rotated in a counter-clockwise direction as viewed in Figure 2.

In Figures 4 and 5 a peel 104 and a core 104a of a fruit are illustrated as having been left in a cup cavity 19a at station D after the fruit body has been removed from the cup during the coring operation. The intermittent rotary motion of the turret 16 on which the fruit cups are mounted causes the fruit cups containing the peel 104 and core 104a to be conducted away from the coring station C, and the mechanism is so arranged that the cups containing such epidermis 104 and core 104a next stop at station or position D. When the cups 19 arrive at station D, the spindles 80 are in an elevated position. The spindles 80 are then swung angularly downwardly by the coaction of rack 92 (which has just started its downward half cycle) and shaft 72 which latter is rotated in a counter-clockwise direction as viewed axially from the front in Figure 1.

Continued rotation of the shaft 72 advances spindles 80 to contact with the cross arm 69 and simultaneously lugs 84 abut against the stop 86. Further rotation of the friction boxes 77 with the shaft 72 is thus prevented. The beveled gears 75 which are keyed to the shaft 72, however, continue to turn with the shaft with the teeth 76a thereon engaging the pinions 81 which rotate spindles 80. Thus the blades 83 are rotated in the cup cavity 19a to scrape the peel and core from the cup 19.

The rack 92 ceases in its downward movement when the wings 83 have turned one hundred and eighty degrees during which rotation the wings have brushed the peel 104 and core 104a from the cup 19. Such peel 104 is temporarily disposed upon the then top face of the blades 83. The rack then reverses its direction of movement to rotate the shaft 72 and block 77 clockwise. Such rotation of shaft 72 lifts the stems 80 from the support 69 without rotating the blades 83 with the result that the peel is transported angularly upwardly upon said flaps.

A ninety degree or more rotation of the sleeves 78 brings the lugs 85 against the stops 86 which prevent further rotative movement of the friction box 77. The sudden stoppage of the angular movement of the plates 83 dislodges the peel and cores therefrom, the peeling and cores falling upon a conveyor or into a discharge chute (not shown) or upon that portion of a gear housing comprising a platform 105 at an angle to the horizontal. The platform 105 extends between the ends 106 which are shown in Figures 1 and 2. Whatever peeling falls on platform 105 will eventually migrate to or be scraped manually onto the discharge conveyor or fall into the discharge chute. Side members 106 are secured to the transverse frame member 15 by means of screws 107.

After the pins 85 strike the bearings 86, the rack 92 continues its upward movement causing gears 75 to rotate pinions 81 and blades 83 one hundred eighty degrees before the next downward stroke of the rack and pinions to angularly move the spindle 80 into registry with the next succeeding pair of cups.

Since shafts 25 of the core removing mechanism and shaft 72 are operated from the identical source of power, the stem 32 of the core removing mechanism and stem 80 of the scavenging mechanism may be made to rise and fall in uniform or in synchronized relation. One may be made to operate at a greater speed than the other by changing the gear ratios between gears 70 and 71.

The cam driving the cam follower 96 is fixed at a given rotative position on main operating shaft 93 so that the coring devices and peeling scavenging instrumentalities operate on material within succeeding pairs of cups 19 while the turret is stationary. Such mechanisms abduct the fruits and refuse respectively, from the cups at different stations.

The present device for scavenging the peel and core from the receptacles or cups has advantages over previously described scavenging equipment in that it is especially rugged and extremely simple of structure and prevents any slippage of peel or core therefrom.

The plate 83 has complemental edge sections 110 which conform to a longitudinal interior peripheral section of a fruit receptacle 19. The plate edges 110 shown are shaped to conform to a cup 19 for holding a half section of a pear. Apertures 111 and 112 in the plate 83 adapt it for attachment to the stem 80 by means of set screws or rivets 113. The apertures 111 and 112 are transversely elongated. Thus the plates 83 may be adjusted transversely of the spindle 80 to cause close or wide approaches to the interior walls of cup 19.

Stamped from the body of the plate 83 are lugs or tangs 114 for impaling or holding the fruit peel or other refuse during certain stages of operation of the device. Although satisfactory impaling lugs may be attached to the plate 83 by means of screws, rivets or welding, the process of manufacture is expedited by stamping the lugs or tangs 114 from the body of the plate and bending them normally thereto in the manner shown.

When a pair of fruit cups 19 containing a section of peel 104 which is sometimes accompanied by a section of core 104a arrive at the scavenging station of the machine, station D, the spindles 80 are tilted about their transverse axes to present the plates 83 to the cups in the fashion illustrated in Figure 4, i. e., with the plates 83 extending flatly across the open sides of the cups 19 and the lugs 114 projecting downwardly thereinto. It will be noted that the lugs 114 are of less length than the radius of the plate 83 with respect to the longitudinal axis of the spindle 80.

The plates 83 and spindles 80 are next rotated substantially one hundred eighty degrees about the horizontal axes of the spindle. Contact with the edge of the fruit peel 104 is had by the edges of the plates 83 so that after rotation of one hundred eighty degrees, the plates, peel and core of the fruit will be in the position illustrated in Figure 5.

When next the spindles or stems 80 are tilted angularly upwardly and away from the cups 19 to a vertical position, the fruit peel 104, and core 104a, if present, drop or are thrown therefrom as hereinabove described. Throwing of the fruit peel and core from the plates is had by suddenly stopping the stems substantially at the time of their reaching the vertical position as previously stated.

Inasmuch as the lugs 114 are at opposite sides of any core 104a carried by a plate 83, it is apparent that lugs 114 prevent accidental displacement of the core section from the plate. It is after the plates have been partly or completely inverted that the lugs 114 tend to impale the fruit peel. Sections of peel will usually collapse under their own weight or slip partly from the plates 83 to become impaled upon the lugs 114. Thus the peel sections are maintained upon the plates until forcibly thrown therefrom. A further means of precluding premature displacement of the core sections 104a from the plates is provided by the half peel sections 104 which frequently form wall-like members about the edges of the plates.

What is claimed as new and is desired to be secured by Letters Patent of the United States is:

1. In combination, a cup, a scavenging device therefor comprising a means having an edge complemental to the interior of said cup, and actuating means for turning said scavenging device on its axis to scavenge the material in the cup therefrom, said scavenging means having means tending to impale thereon scavenged material during the turning of said scavenging means in the cup.

2. In combination, a fruit treating device having a fruit cup, a scavenging device comprising a plate having an edge conforming to the interior of said cup, means for rotating said plate with such edge in proximity to the interior of said cup, and lugs upon a face of said plate for preventing slippage of refuse therefrom.

3. A fruit treating device having a fruit cup, a scavenging device comprising a plate having an edge conforming to the interior of said cup, means for rotating said plate with such edge in proximity to the interior of said cup for transferring refuse therein onto said plate, and means comprising lugs upon a face of said plate at opposite sides of the axis of rotation thereof for preventing slippage of the refuse therefrom.

4. In combination, a cup to receive fruit, a plate rotatable about a central axis and having edges complemental to the interior of said cup for scavenging said cup, means for rotating said plate with one of its edges in proximity to the interior of said cup, means for tilting said plate to discharge scavenged material therefrom, and lugs on said plate for preventing premature discharge of scavenged material from said plate, said lugs being of less length than the radius of said plate.

5. For use with a fruit treating machine having a fruit cup, a scavenging device comprising a plate having an edge complemental to the interior of such cup, means for rotating said plate about an axis removed from such edge, said rotating means guiding the edge of said plate in proximity to the interior of such cup, means for moving said plate away from said cup to discharge scavenged material from said plate, and a peel impaling lug normal to a face of said plate and removed from the edge thereof for preventing premature discharge of such scavenged material from said plate.

6. A fruit treating machine having a fruit cup, a scavenging device comprising a plate having an edge complemental to the interior of said cup, means for rotating said plate about an axis therein removed from such edge to guide such edge in proximity to the interior of said cup, means for shifting said plate subsequently to such rotation to discharge the peel therefrom, and peel impaling sections integral with said plate and projecting normally from a face thereof at each side of the rotating axis thereof for preventing premature discharge of scavenged material from said plate.

7. In combination, a holder in which a fruit peel has been deposited, a scavenging device therefor comprising means having a peripheral portion complemental to the interior of said holding means, means for turning said peripheral means with its edge in proximity to the interior of the holding means, said peripheral means including a device for preventing the slippage of refuse therefrom after said peripheral means has been turned to remove the refuse from the holding means.

8. For use with a fruit treating machine having a fruit cup, a scavenging device comprising a plate-like member having an edge complemental to the interior of such cup, means for rotating said plate-like member about an axis removed from such edge whereby to wipe from said cup peelings or other refuse, said plate-like member having portions struck up therefrom and extending laterally from the side face of said plate for preventing the premature discharge of such scavenged material from said plate.

9. A fruit treating machine having a fruit holder in which the peel is deposited, a scavenging device comprising a stem adapted to overlie said holding device and to rotate approximately one hundred eighty degrees relative to said holding device when in overlying position, a plate having an edge complementary to the interior of the holding device, said stem having a longitudinal counterseat therein, said plate being seated in said counterseat, said plate being provided with spaced slots elongated transversely of the axis of the stem, to provide adjustment of the plate transversely of the stem, and means engaging said plate and stem for holding the plate in adjusted position relative to the stem.

10. In combination, a fruit holder having a substantial cup-like inner wall, a scavenging device therefor comprising a rotatable spindle adapted to rotate relatively to the cup, a scavenging member having a periphery complemental to the interior of the cup, and means for securing said peripheral member to said spindle including means for adjusting the peripheral member transversely of the spindle to cause close or wide approaches of the peripheral member to the interior wall of the holding means.

11. In combination, a fruit holder having an interior wall of substantially cup-like shape, a scavenging device therefor comprising a member having a periphery complemental to the interior wall conformation of the holding means, means for rotating said peripheral member about an axis passing longitudinally through the peripheral member and through the fruit holding means, and means for adjusting the peripheral member transversely of the axis about which it turns to cause the peripheral member to be adjusted to the interior walls of the holding means.

12. In combination, a cup, a scavenging device therefor comprising a member having an edge complemental to the interior of the cup, means for turning the scavenging member about the longitudinal axis of the cup, said peripheral member having spaced-apart, laterally extending members adapted to retain therebetween a core wiped from the cup by the rotary movement of said scavenging device.

13. In combination, a cup adapted to hold the peeling and core of a half pear, a scavenging device therefor comprising means having an edge complemental to the interior of the cup, means for rotating said means whereby to wipe the peeling and core out of the cup and deposit the same in superposed relation to said scavenging means, said first mentioned means including peel impaling and core retaining means for preventing the premature movement of the peel and the core from said means.

14. In combination, a fruit holder having an inner wall of substantially cup-shaped contour, a scavenging device having a peripheral edge complemental to the interior wall of the cup, a spindle carrying said scavenging device, a drive shaft adapted to rotate said spindle in alternately reverse directions and a gearing connection between said shaft and said spindle for shifting said spindle bodily to position the scavenging device over the cup and for thereafter rotating the spindle about its own axis to sweep the scavenging device through the cup, said drive shaft and spindle being disposed wholly at one side of the cup.

15. In combination, fruit holding means having an inner surface of substantially cup-like formation for receiving refuse fruit peeling, a scavenging device having a peripheral portion complemental to the interior conformation of the cup, a spindle carrying said scavenging device, said spindle being disposed wholly at one side of the cup, a drive shaft to rotate in alternate reverse directions, a toothed gear fastened on said shaft, an intermeshing gear on said spindle, said gear and drive shaft being disposed at one side of the cup only, and means actuated by said rotations of the shaft to position said spindle and scavenging mechanism directly over said cup, thereafter to rotate said spindle on its axis substantially one hundred eighty degrees, thereafter to shift said spindle and scavenging mechanism bodily substantially ninety degrees, thereafter to rotate said spindle on its axis substantially one hundred eighty degrees and thereafter to reposition said spindle and said scavenging device over said cup.

16. A device of the class described, means providing a recessed holding means for holding a half fruit with its cut face uppermost, a scavenging device therefor comprising means having an edge complemental to the interior of the cup, means to turn said device to cause said edges to sweep through the cup to scavenge loose peeling lying loosely in the cup from the cup, and means on said device adapted to maintain the loose peel on the device as said edges are swept through the cup whereby to prevent said loose peel from slipping off the device and back into the cup.

17. The combination of a fruit holder having a substantially cup-like inner wall, a scavenging device therefor comprising a turnable spindle adapted to turn relatively to the cup, a scavenging member having a periphery complemental to the interior of the cup, said scavenging member having slots therein elongated in a direction transverse to the axis of the rotatable spindle, and means adapted to pass through the elongated slots and into said spindle for adjustably securing the peripheral member of said spindle including the adjustment of the peripheral member transversely of the spindle to cause close or wide approaches of the peripheral member to the interior wall of the holding means.

18. In a peel scavenging device for fruit processing machines, in combination with a fruit holding receptacle having inner walls conforming to the cross section of a half fruit, a shaft, driving means on said shaft, means for turning said shaft and driving means, a support associated with said shaft and turnable about its axis, peel scavenging means mounted on said support and arranged to turn with said support about the axis of said shaft to position said scavenging member into registration with the mouth of the cup, means for arresting movement of said support and member when so positioned, and means actuated by said driving means for thereafter turning said scavenging means alone about the axis of said support to scavenge the cup.

19. A fruit treating apparatus comprising a cup to hold loosely a severed peeling of a half fruit, scavenging means adapted to be positioned substantially to close the open mouth of the cup, said scavenging means having marginal edges extending relatively close to the inner walls of said cup, means disposed wholly at one side only of the cup for positioning the scavenging member to lie diametrically of the mouth of the cup and thereafter for turning the scavenging member on its own axis to close its marginal edges to sweep through the inner walls of the cup thereby to scavenge the same.

20. In combination with a recessed cup having a severed peel lying loosely therein, scavenging means having a cross sectional outline corresponding to and only slightly less in dimension than the cross sectional outline of the mouth of the cup, a shiftable support for said scavenging means, and power operated means connected to only one end of the support for swinging said support and the scavenging means thereon from a position removed from the mouth of the cup to a second position with the axis of the mouth of the cup and the axis of said scavenging means substantially coincident, and for thereafter turning said scavening means about its own axis to cause the same to sweep through the cup to scavenge the peel therefrom.

21. In a fruit treating apparatus in combination with a receptacle adapted to contain the severed peel of a half fruit, means for scavenging the peel from the receptacle comprising a member carrying a flat section, adapted to be moved into registry with the mouth of said receptacle and with such section parallel with the plane of the mouth of said receptacle and with the periphery of said section registering substantially with the inner walls of the receptacle and slightly spaced therefrom, and means including a slip clutch device for bodily moving said member to position said section into registration with said receptacle, said means being operable after such registration for turning said member about its own longitudinal axis and while said flat section is in the plane of the mouth of the receptacle, whereby to scavenge said receptacle.

22. In a peel scavenging device for fruit cups in combination with a dished receptacle adapted to hold the severed peeling of a half fruit, means for scavenging said receptacle having peripheral edges of slightly less cross sectional dimension than the inner walls of the receptacle, a driven shaft, supporting means for said scavenging means and turned by said shaft to be positioned across the mouth of said receptacle for positioning said scavenging means across the mouth of the receptacle with its margins in registration with said inner walls of the receptacle, gears on said shaft and supporting means for turning said supporting means on its own axis while said supporting means lies in the plane of the mouth of said receptacle whereby to wipe the scavenging means through said receptacle to scavenge the peel therefrom.

23. A peel scavenging device for a fruit treating machine comprising a shaft, a support turnable about a first axis, a peel scavenging member mounted on said support for swinging movement with said support about said first axis, said scavenging member being mounted for turning movement about the longitudinal axis of said support, driving means between said shaft and support for simultaneously moving said support and said scavenging means about said first axis, and driving means between said shaft and support for causing movement of said scavenging means alone about the longitudinal axis of said support.

24. In a fruit treating machine the combination of a receptacle adapted to contain the peeling of a half fruit, an elongated support, means at one end of said support forming an axis about which said support is adapted to turn, scavenging means mounted on said support for movement therewith, said scavenging means having marginal portions complemental to the cross sectional shape of the inner walls of the fruit receptacle, and common means for turning said elongated support and said scavenging means about said first mentioned axis to position the scavenging means in registration with the mouth of the receptacle and for thereafter turning said scavenging means about the central axis of the longitudinal support to cause the scavenging means to wipe through the receptacle to scavenge the peel therefrom.

25. In a fruit treating machine, the combination of a receptacle adapted to contain the peeling of a half fruit, an elongated support, means at one end of said support forming an axis about which said support is adapted to turn, scavenging means mounted on said support for movement therewith, said scavenging means being mounted for turning about the central axis of said longitudinal support, said scavenging means having marginal portions complemental to the cross sectional shape of the inner walls of the fruit receptacle, means for turning said elongated support and said scavenging means about said first mentioned axis to position the scavenging means in registration with the mouth of the receptacle and for thereafter turning said scavenging means about the central axis of the longitudinal support to cause the scavenging means to wipe through the receptacle to scavenge the peel therefrom, means for thereafter swinging said elongated support and said scavenging means about said first mentioned axis, away from said receptacle, and means for causing the abrupt discharge of said scavenged peel from said scavenging means.

26. An article of manufacture comprising a peel scavenging blade comprising a flat, thin blank of sheet metal, having a shape conforming generally to the cross sectional dimension of the cut face of a half pear, said blank having at widely spaced apart portions thereof openings, elongated in a direction transversely to the longitudinal axis of said blank, and said blank having additional punched-out portions disposed in the wider portion of said blank on opposite sides of the longitudinal axis, each of said punched-out portions including an integral tongue disposed at right angles to the face of the blank.

27. A combination of a fruit cup having walls, of a scavenging device therefor, comprising an elongated support, means secured to said support having an edge conforming generally to a section across the interior of said cup, means disposed wholly at one end of said support for oscillating said support alternately substantially about 90 degrees about an axis transverse thereof and substantially 180 degrees about an axis longitudinal thereof, said oscillating means including mechanism causing the initial part of the oscillation longitudinally of said support to occur while said means is in registry with said cup with the edge thereof adjacent the interior walls of said cup and the initial part of the transverse oscillation of said support thereafter to lift said means from said cup.

28. A combination of a fruit cup having walls of a scavenging device therefor, comprising an elongated support, means secured to said support having an edge conforming generally to a section across the interior of said cup, means disposed wholly at one end of said support for oscillating said support alternately substantially about 90 degrees about an axis transverse thereof and substantially 180 degrees about an axis longitudinal thereof, said oscillating means including mechanism causing the initial part of the oscillation longitudinally of said support to occur while said means is in registry with said cup with the edge thereof adjacent the interior walls of said cup and the initial part of the transverse oscillation of said support thereafter to lift said means from said cup and a plurality of spaced stops associated with the means for oscillating said support and a cooperating stationary stop adapted to be engaged by said spaced stops for limiting the oscillatory movement of said support.

29. In combination with a fruit cup, having walls of a scavenging device therefor comprising an elongated support, scavenging means secured to said support and having a margin conforming generally to a section across the interior of said cup, means including a frictional driving mechanism for oscillating said support alternately substantially 90 degrees about an axis transverse to said support and substantially 180 degrees about an axis longitudinally of said support, said oscillating means including mechanism causing the initial part of the oscillation longitudinally of the support to occur while said scavenging means is in registry with said cup, with the edge thereof adjacent the interior walls of said cup, and the initial part of the transverse oscillation of said support thereafter to lift said scavenging means from said cup.

30. A fruit treating apparatus comprising a cup loosely to hold the severed peeling of a half fruit, a power turned drive shaft, a support adapted normally to turn with said shaft but having a slip connection therewith whereby to permit said support to cease from turning during continued turning movement of said shaft, a scavenging member mounted on said support and having a cross sectional outline corresponding to and only slightly less in dmension than the cross sectional outline of the mouth of the cup, a sectional gear on said drive shaft, a gear on said support adapted to mesh with the teeth of said sectional gear, and means for arresting turning movement of said support with said first mentioned shaft when said scavenging member has been brought into registry with the mouth of the cup whereby to cause rotation of said scavenging member about its own axis by said intermeshing gears.

MARK EWALD.